Dec. 24, 1946.   C. F. DE VOE   2,413,037
ELECTRIC GLASS MELTING FURNACE
Filed Sept. 18, 1943    2 Sheets-Sheet 1

Inventor
CHARLES F. DEVOE
By F. H. Knight
Attorney

Patented Dec. 24, 1946

2,413,037

UNITED STATES PATENT OFFICE 2,413,037

ELECTRIC GLASS MELTING FURNACE

Charles F. De Voe, Corning, N. Y., assignor to Corning Glass Works, Corning, N. Y., a corporation of New York Application September 18, 1943, Serial No. 503,006

12 Claims. (Cl. 13—6)

The present invention relates to electric glass melting furnaces and is particularly concerned with the provision of a furnace capable of melting, fining and delivering glass of optical quality continuously, as distinguished from various apparatus heretofore employed in producing melts of optical glass in pots or the like. So far as applicant is aware the melting of glass of fine optical quality by a continuous method has heretofore been unsuccessful. Inherently, the development of a glass melting tank capable of continuously producing glass of optical quality also permits continuous production of glass for other uses of a quality far better than heretofore considered possible, with the resulting products better in appearance and quality and with the selection of usable ware greatly increased. It will therefore be appreciated that whereas the primary object of the present invention is facilities by means of which volume production of optical quality glass is made possible, the invention is by no means limited in usefulness to this field but includes the broad object of an electrically heated glass melting furnace capable of producing highly homogeneous glass for all types of glassware.

By way of example, the invention may be embodied in an electric glass melting furnace of T-shape composed of a relatively long and narrow melting tank forming the head of the T, coupled midway of its ends by a submerged throat or lateral take-off opening, to an end of a rectangular tank divided into two conditioning sections forming the stem of the T. The glass entering the first conditioning section of the latter tank passes through an elevated but submerged throat in a bridgewall into the second conditioning section which is also the delivery section. Batch materials are introduced into end regions of the melting tank and the melting is accomplished in these regions by passing currents of electricity through the glass at such potentials that sufficiently high density current conditions are established to rapidly melt the glass. On the other hand, just sufficient current is passed through the glass between the two end regions to maintain a desired viscosity. By properly apportioning the current densities in the respective regions, convection currents can be controlled to prevent mixing of the unmelted glass in the end regions with that glass permitted to pass through the lateral take-off to the first conditioning section of the tank forming the stem of the T.

The glass in the conditioning section of the latter tank is, on the other hand, heated without disturbance of its fined condition or material loss by volatilization, solely by banks of silicon carbide resistance heating elements arranged above the glass. The glass in the first conditioning section passes to the second conditioning section through an elevated throat which is arranged a substantial distance above the bottom of the tank and accordingly glass supplied to the second conditioning section may be said to be taken from a stratum intermediate the top and bottom strata of glass therein. In other words, both bottom and top skimming take place so that only the most highly refined glass passes from the first section to the second section.

The glass to be worked is taken from the second section of the tank via a tube projected through the tank bottom and has its upper open end at such height as to tap glass from that stratum of the pool found by practice to be of higher quality than obtainable at other heights, as brought out in a companion De Voe application, Serial No. 503,005, filed on even date herewith.

Figure 1:
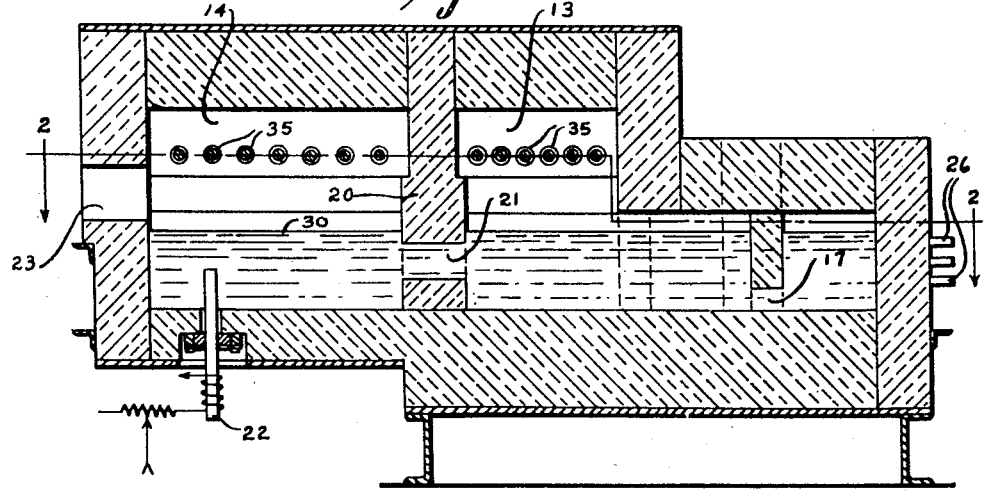
Fig. 1 is a side elevational view, in section, of a furnace embodying the invention.

Referring to the drawings in detail the structure illustrated comprises a relatively long and narrow melting tank 11 whose mid-section is structurally attached to the first conditioning section of a tank 12. Although in a structure of the proportions shown tank 11 is of approximately square transverse cross section, as the heat loss is less than otherwise, the structure may be made oblong in cross section if desired. The tank 11 is provided near its ends with top openings 25 through which batch materials may be introduced. Currents of electricity are passed through the glass in the respective end and intermediate sections of tank 11 by means of groups of submerged rods 26, 26', 27 and 27' arranged transverse the tank. The groups of rods 26 and 27 serve as a pair of electrodes adapted to pass melting current through the glass in one end region of the tank below one of the batch feed openings 25. The groups of rods 26' and 27' function in like capacity at the opposite end of the tank below the remaining batch feed opening 25. The groups of rods 26 and 26' also serve as a pair of electrodes for passing current through that glass in the region of the tank containing the submerged lateral take-off or throat 17 (Fig. 1).

Tank 12 is divided into two conditioning sections 13 and 14 by a bridgewall 20 having an elevated throat 21 whose top is well below the glass line and whose bottom is well above the level of the tank bottom.

The forward end of the tank section 14 has a bottom outlet through which a feeder die 22 of platinum or the like passes. The upper open end of die 22 is at just the right height to receive glass from the stratum of the pool containing the best glass. Also, the forward end wall of section 14 has an opening 23 through which charges of glass may be gathered manually.

In brief the operation is as follows. Batch materials are introduced into the end regions of the tank through openings 25 and rapidly melted in the end regions. Glass in these regions gradually passes into the intermediate region of the tank where it is maintained in a desired fluid state until it passes through the submerged lateral take-off outlet 17 to the first conditioning section 13 of tank 12 thence to section 14.

Figure 3:
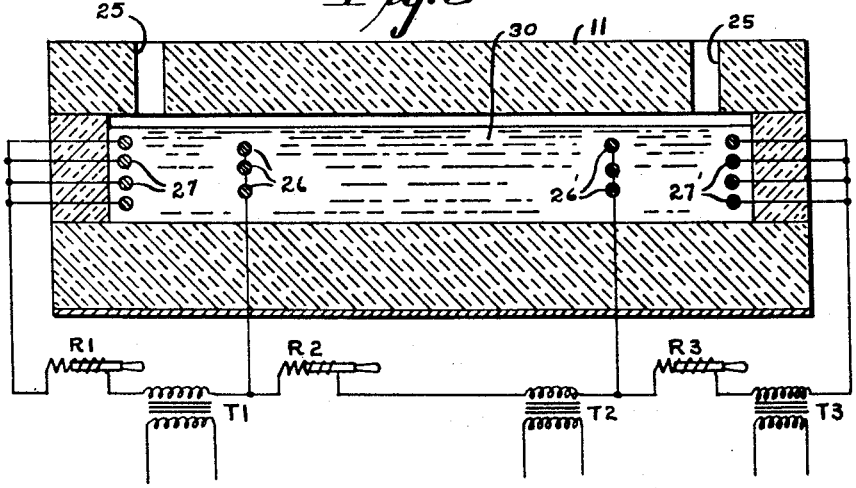
Fig. 3 is a view taken on line 3—3 of Fig. 2 with a circuit diagram superimposed therein.
Figure 2:
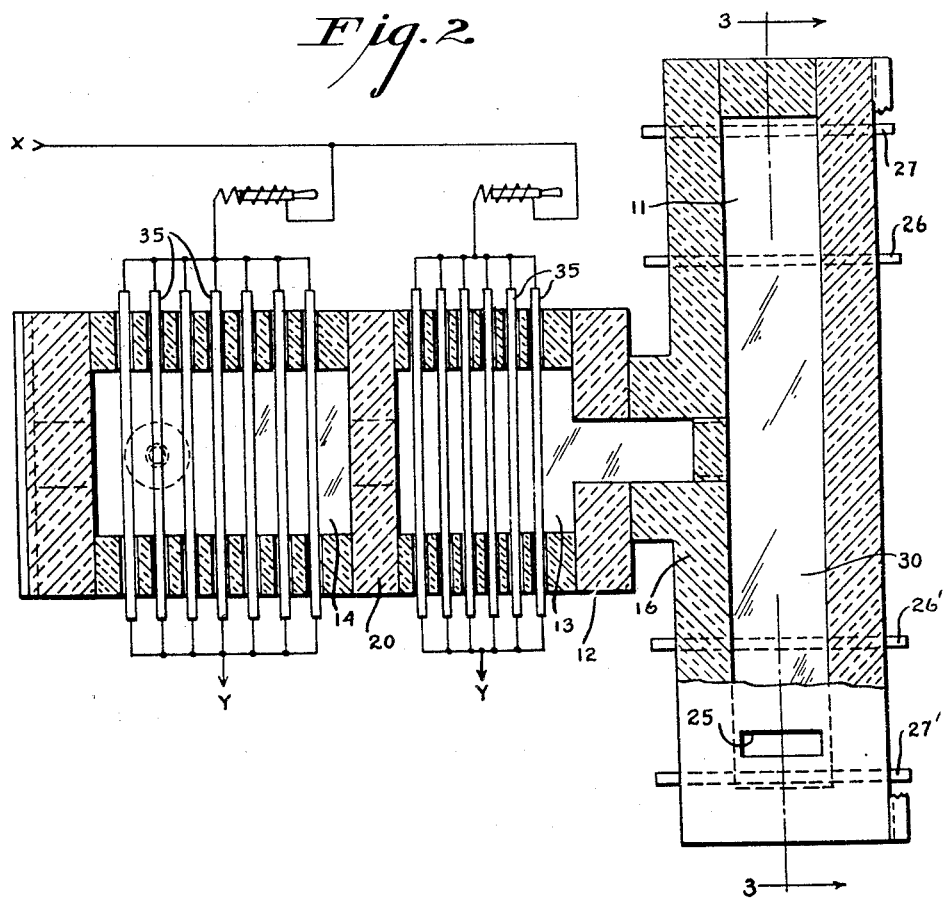
Fig. 2 is a view of the furnace taken on line 2—2 of Fig. 1.

As illustrated in Fig. 3 the groups of rods 26 and 27 are supplied with electrical potential by a transformer T1 and the current density in the glass between these groups of rods controlled by the setting of a direct current saturable core reactor R1. In like manner rods 26' and 27' are supplied with electrical potential by a transformer T3 and the current density controlled by a direct current saturable reactor R3. Similarly, potential is supplied to the groups of rods 26 and 26' by a transformer T2 and the current density controlled by a reactor R2. The glass in the two conditioning sections 13 and 14 is maintained at the desired temperatures by energy supplied by resistance heating elements 35 receiving current from a suitable source X—Y.

Although in the foregoing there has been shown and described the preferred embodiment of the invention, it is to be understood that minor changes in the details of construction and combination of parts may be resorted to without departing from the spirit and scope of the invention as claimed.

What is claimed is:

1. A relatively long and narrow glass melting tank, pairs of electrodes passing transversely through tank ends below the normal glass level therein, a cover for said tank having batch feed openings through which glass batch introduced is deposited between electrodes of the respective pairs, means for creating a high density current through glass between the respective pairs of electrodes, and means for creating a low density current through the glass occupying the space between oppositely disposed electrodes of the respective pairs.

2. In an apparatus for melting, fining, and delivering glass, a T-shaped furnace in which the ends of the top of the T each contain a pair of electrodes laterally spaced from one another, a cover over said furnace having glass batch feeding openings arranged above the spaces between the respective pairs of electrodes, a throat between a portion of the top of the T intermediate said pairs of electrodes in communication with the adjoining end of the stem of the T, means for creating a high density current flow through the glass between the electrodes of the respective pairs to rapidly melt the batch therebetween, and means for creating a relatively low density current flow in the glass between opposing electrodes of the respective pairs to maintain the glass therebetween in a suitably fluid state, the amount of heat introduced between the opposing electrodes being insufficient to set up convection currents of such magnitude or range as to bring about material mixing of the glass with unmelted batch materials from between the respective pairs of electrodes.

3. In a glass melting furnace a relatively long and narrow melting tank, a relatively long and narrow tank connected at one end to the melting tank midway between its ends via a submerged throat extending to the bottoms of said tanks, a bridgewall dividing the latter tank into two sections and having therethrough a submerged throat whose bottom is well above the bottom of the tank, submerged pairs of glass melting electrodes arranged near the ends of said melting tank, and radiant heating means arranged above the glass level in the second specified tank.

4. In an electric furnace for the melting of glass in which a bath of molten glass serves as a resistance to the flow of electric current, a melting container of generally rectangular outline having a glass batch receiving opening in each end and a glass flow outlet intermediate its ends, electrodes in the respective ends of the container, means including adjustable circuits for applying potentials to the electrodes as required to create areas of high current density in the respective ends of the container capable of melting batches introduced through said batch openings, and an adjustable circuit for applying selected potentials to certain of the electrodes to create a low density current in the area occupied by the flow outlet.

5. In an electric furnace for the melting of glass in which a batch of molten glass serves as a resistance to the flow of electric current, a melting container of generally rectangular outline having a glass batch receiving opening in each end and a glass flow outlet intermediate its ends, electrodes in the respective ends of the container, means including adjustable circuits for applying potentials to the electrodes as required to create areas of high current density in the respective ends of the container capable of melting batches introduced through said batch openings, and an adjustable circuit for applying selected potentials to certain of the electrodes to create a low density current between the high density current areas.

6. A glass melting and fining furnace of T shape, having a pair of electrodes in each end of the head of the T, and an opening between the electrodes of each such pair through which glass batch material may be supplied, means for creating a potential difference between the electrodes of each pair and between opposite electrodes of both pairs, and means for heating the stem of the T.

7. A glass melting and fining furnace of T shape, having a pair of electrodes in each end of the head of the T arranged parallel to the stem of the T and one electrode of each pair being arranged inward toward the center of the head of the T, said head of the T having an opening located between each pair of electrodes for passing of batch into the head of the T, means for creating a potential difference between the electrodes of each pair and between the inwardly located electrodes of the two pairs, and means for heating the stem of the T.

8. A glass melting and fining furnace of T shape having a glass batch receiving opening near each end of the head of the T, a pair of electrodes in each end of the head of the T between which batch passed through said openings is deposited, means for creating a potential difference between the electrodes located between the openings and between the remaining electrodes, and means for heating the stem of the T.

9. A rectangular glass melting tank having a batch receiving opening near each end, electrodes arranged along the length of said tank, at least two of the electrodes being between the batch receiving openings, and the two batch receiving openings being between at least two other of the electrodes, and means for creating a potential difference between the first specified two electrodes and between such electrodes and those between which the batch receiving openings are located.

10. A T-shaped melting and fining furnace in which glass batch receiving openings are arranged near the ends of the head of the T and the working opening is near the foot of the T; electrodes arranged in spaced relation along the length of the head of the T, at least two of the electrodes being between the batch receiving openings, and the two batch receiving openings being between at least two other of the electrodes; means for creating a potential difference between the first specified two electrodes and between such electrodes and those between which the batch receiving openings are located, and means for maintaining a desired temperature in the stem of the T.

11. In an electric furnace for melting glass in which a bath of molten glass serves as a resistance heating element for said furnace, a long narrow melting chamber of approximately square transverse cross section, a submerged electrode extending transversely of said melting chamber closely adjacent each end wall thereof, other submerged electrodes extending transversely of said melting chamber at points spaced from said end electrodes and from each other, means for establishing a current flow of high density between said end electrodes and the other electrodes adjacent thereto, and additional means for establishing a separately controlled current flow in the glass between said other electrodes, said melting chamber having a lateral take-off opening for the molten glass midway of the ends.

12. In an electric furnace for melting glass in which a bath of molten glass serves as a resistance heating element for said furnace, a long narrow melting chamber of approximately square transverse cross section, submerged electrodes extending transversely of said melting chamber closely adjacent both end walls thereof, other submerged electrodes extending transversely of said melting chamber at points spaced from said end electrodes and from each other, means for establishing a current flow of high density between said end electrodes and the other electrodes adjacent thereto, additional means for establishing a separately controlled current flow in the glass between said other electrodes, said melting chamber having a lateral take-off opening for the molten glass midway of the ends, and a cover for said melting chamber, said cover having batch feeding openings near its ends over the space between the end electrodes and the other electrodes.

CHARLES F. DE VOE.